United States Patent
Satou (10) Patent No.: US 7,734,311 B2
(45) Date of Patent: Jun. 8, 2010

(54) MULTIMODE COMMUNICATION APPARATUS

(75) Inventor: Mitsuru Satou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 513 days.

(21) Appl. No.: 11/815,033

(22) PCT Filed: Jan. 27, 2006

(86) PCT No.: PCT/JP2006/301345

§ 371 (c)(1),
(2), (4) Date: Jul. 30, 2007

(87) PCT Pub. No.: WO2006/080453

PCT Pub. Date: Aug. 3, 2006

(65) Prior Publication Data

US 2009/0054008 A1 Feb. 26, 2009

(30) Foreign Application Priority Data

Jan. 31, 2005 (JP) ............................. 2005-022615

(51) Int. Cl.
*H04M 1/00* (2006.01)
*H04B 1/16* (2006.01)

(52) U.S. Cl. .................. 455/553.1; 455/340; 455/114.1; 455/77

(58) Field of Classification Search ................. 455/339, 455/340, 114, 125, 552.1, 553.1, 77, 78, 455/88

See application file for complete search history.

(56) References Cited

U.S. PATENT DOCUMENTS

| 5,815,804 | A  | * | 9/1998 | Newell et al. ................. 455/78 |
| 6,023,609 | A  | * | 2/2000 | Futamura ..................... 455/82 |
| 6,472,953 | B1 | * | 10/2002 | Sakuragawa et al. ........ 333/133 |
| 6,542,724 | B1 | * | 4/2003 | Copeland et al. ............ 455/302 |
| 6,861,924 | B2 | * | 3/2005 | Machui ...................... 333/133 |
| 7,376,440 | B2 | * | 5/2008 | Forrester et al. ......... 455/553.1 |
| 7,636,554 | B2 | * | 12/2009 | Sugar et al. ................... 455/73 |

FOREIGN PATENT DOCUMENTS

JP        2004-222171       5/2004

* cited by examiner

*Primary Examiner*—Duc M Nguyen
(74) *Attorney, Agent, or Firm*—Pearne & Gordon LLP (57) ABSTRACT

In a multimode communication apparatus that uses a plurality of wireless communication modes, interference between communications under different wireless communication modes is suppressed, a good transmission/reception state in each of the wireless communication modes is ensured. A multimode communication apparatus (100) includes transmitter sections (33), (43) and receiver sections (32), (42) and a plurality of communication units (70), (80) each being compatible with the wireless communication modes independently of one another. The communication unit (70) includes a variable channel band elimination filter (34) for suppressing, among transmission signals from its own transmitter section (33), a band corresponding to a frequency band of a reception channel that is being received by the receiver section (42) of the other communication unit (80). The variable channel band elimination filter (34) is capable of varying the band that is to be suppressed, in response to a change of the frequency band of the reception channel.

5 Claims, 5 Drawing Sheets

| RECEPTION FREQUENCY (CHANNEL) | OUTPUT VOLTAGE |
|---|---|
| 1 c h | 1. 0 V |
| 2 c h | 1. 2 V |
| 3 c h | 1. 4 V |
| 4 c h | 1. 6 V |
| 5 c h | 1. 8 V |
| 6 c h | 2. 0 V |
| 7 c h | 2. 2 V |
| 8 c h | 2. 4 V |
| 9 c h | 2. 6 V |
| 1 0 c h | 2. 8 V |

| OUTPUT VOLTAGE | STATUS OF SELECTOR SWITCH |
|---|---|
| 1.0 V | ON |
| 1.2 V | ON |
| 1.4 V | ON |
| 1.6 V | OFF |
| 1.8 V | OFF |
| 2.0 V | OFF |
| 2.2 V | OFF |
| 2.4 V | OFF |
| 2.6 V | OFF |
| 2.8 V | OFF |

FIG. 6

MULTIMODE COMMUNICATION APPARATUS

TECHNICAL FIELD

The present invention relates to a multimode communication apparatus that uses a plurality of wireless communication modes, and more particularly to a multimode communication apparatus that can suppress adverse effects that a transmission wave under one mode has on the communications of other modes.

BACKGROUND ART

In recent years, mobile communication terminals, in particular, have been provided with more advanced functions in association with the advancement and proliferation of wireless communication modes. In addition, due to the proliferations of mobile terminals compatible with both domestic and international services, wireless LAN, and the like, it has been required that one wireless communication apparatus should be compatible with two or more wireless communication modes. Moreover, the frequency bands used by various wireless communications tend to become closer in association with the progress of the effective use of frequencies.

Conventionally, when two or more wireless communication modes are operated in a single wireless communication apparatus, a transmission wave of a certain mode raises the noise floor of the reception band of another mode. This phenomenon has deteriorated the reception sensitivity of another communication mode.

Specifically, in a multimode communication apparatus that incorporates a plurality of components (communication units) each provided with a transmitter unit and a receiver unit, degradation in wireless communication characteristics occurs mutually when the respective units are operated at the same time. When one of the units transmits a radio wave, the transmission wave raises the noise floor of the reception band in another system, degrading the reception sensitivity of the other system(s), in particular, in the case that the frequency bands used by the wireless communication modes of the units are close to one another. That is, the frame error rate (FER) and the bit error rate (BER), for example, increase.

In order to resolve such a problem, it is conceivable to provide the transmitter section of each of the units with various filters, such as variable frequency stop filter, band pass filter (BPF), and band elimination filter (BEF) (see Patent Document 1).

Nevertheless, since various filters such as mentioned above have high attenuation, transmission waves that pass through the filters suffers from great loss. Moreover, if another unit with a different wireless communication mode is added, it will become necessary to add a filter that is compatible with the frequency band of that system. Such addition of the filter brings about further power loss in pass band and an increase in size of the apparatus. An increase in power loss in pass band results in a shorter wireless communication distance and a narrower communication area.

Patent Document 1: JP-A-2004-222171

The present invention relates to a multimode communication apparatus that uses a plurality of wireless communication modes, and particularly, it is an object of the invention to provide a multimode communication apparatus that can suppress adverse effects that a transmission wave under one mode has on the communications of other modes.

DISCLOSURE OF THE INVENTION

Means for Solving the Problems

A multimode communication apparatus in accordance with the invention is a multimode communication apparatus compatible with a plurality of wireless communication modes, including: a plurality of communication units which are compatible with the wireless communication modes independently of one another, and each of which includes a transmitter section and a receiver section. At least one of the communication units includes a variable channel band elimination filter which suppresses, in a transmission signal from its own transmitter section, a band corresponding to a frequency band of a reception channel received by a receiver section of another communication unit. The variable channel band elimination filter is capable of varying the band to be suppressed in response to a change of the frequency band of the reception channel.

By using the variable channel band elimination, the multimode communication apparatus of the invention makes it possible to suppress, in the transmission signal from one of the communication units, a band corresponding to a frequency band of a reception channel received by a receiver section of another communication unit. Therefore, it becomes possible to suppress deterioration of reception sensitivity due to interference between communication units even in an apparatus that incorporates a plurality of wireless communication modes whose frequency bands are close to one another.

In the case that the plurality of communication units includes a first communication unit and a second communication unit, the multimode communication apparatus may be configured so that the first communication unit includes the variable channel band elimination filter, and the second communication unit further includes a frequency setting section for setting a frequency band of the reception channel, and a frequency-voltage converter section for converting the frequency band set by the frequency setting section into a voltage and supplying it to the variable channel band elimination filter.

With the just-mentioned configuration, it becomes possible to reliably detect the frequency band of the reception channel that is being received in the receiver section of the second communication unit and to send it to the variable channel band elimination filter of the first communication unit with converting the frequency band into a voltage.

In addition, the first communication unit may further include a selector switch for detecting the voltage from the frequency-voltage converter section. The selector switch is connected between the transmitter section and the variable channel band elimination filter. The selector switch selects, based on the voltage, a first path for supplying a transmission signal from the transmitter section to the variable channel band elimination filter or a second path for not supplying transmission signal from the transmitter section to the variable channel band elimination filter.

According to the just-described configuration, the transmission signal does not pass through the variable channel band elimination filter when a voltage corresponding to the frequency band of the reception channel being received is not input to the selector switch, such as when the first communication unit is not used. Therefore, loss of the transmission signal in pass band is prevented.

Moreover, the multimode communication apparatus may be designed so that each of the first communication unit and the second communication unit includes all the already-mentioned elements, and the first communication unit and the second communication have configurations equivalent to each other.

With the just-mentioned configuration, the above-described workings can be obtained in the transmission and reception of both the first communication unit and the second communication unit.

In addition, the variable channel band elimination filter may include a notch filter.

ADVANTAGES OF THE INVENTION

According to the invention, it becomes possible to suppress interference between communications under different wireless communication modes and to ensure a good transmission/reception state in each of the wireless communication modes in multimode communication apparatus that uses a plurality of wireless communication modes.

DESCRIPTION OF THE REFERENCE NUMERALS 10 antenna
20 antenna duplexer
30 first transmitter-receiver section
31, 41 duplexer
32 first communication mode receiver section
33 first communication mode transmitter section
34, 46 variable channel band elimination filter
35, 47 selector switch
36, 45 synthesizer
40 second transmitter-receiver section
44 band pass filter
50 first signal processing and controlling section
51, 61 frequency setting section
52, 62 frequency-voltage converter section
60 second signal processing and controlling section
70 first communication unit
80 second communication unit
100, 200 multimode communication apparatus

BEST MODE FOR CARRYING OUT THE INVENTION

Hereinbelow, embodiments of the present invention will be described with reference to the drawings.

First Embodiment

Figure 1:
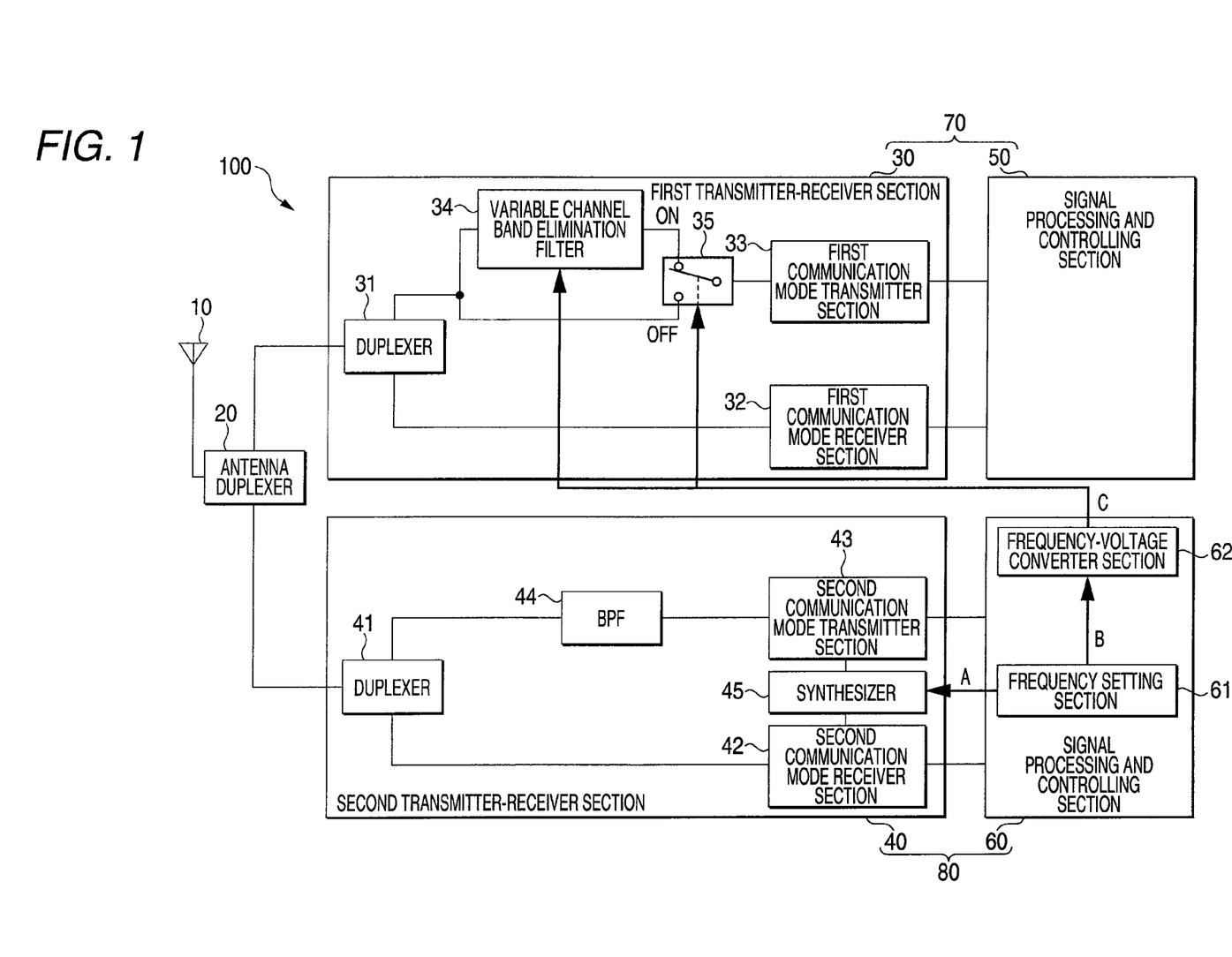
FIG. 1 is a block configuration diagram of a multimode communication apparatus according to a first embodiment.

First, a multimode communication apparatus according to a first embodiment of the invention will be described. FIG. 1 is a block diagram of a multimode communication apparatus 100 according to the first embodiment of the invention.

The multimode communication apparatus 100 shown in FIG. 1 includes an antenna 10 used for both transmission and reception, an antenna duplexer 20 (duplexer), a first communication unit 70 that is compatible with a first wireless communication mode, and a second communication unit 80 that is compatible with a second wireless communication mode. The first communication unit 70 and the second communication unit 80 are asynchronous with each other and perform transmission and reception independently.

The first communication unit 70 includes a first transmitter-receiver section 30 and a first signal processing and controlling section 50. The second communication unit 80 includes a second transmitter-receiver section 40 and a second signal processing and controlling section 60.

The first transmitter-receiver section 30 includes a duplexer 31 for coupling two high-frequency paths with difference frequencies, a first communication mode receiver section 32 that is compatible with the first wireless communication mode, a first communication mode transmitter section 33 that is compatible with the first wireless communication mode, a variable channel band elimination filter 34, and a selector switch 35.

On the other hand, the second transmitter-receiver section 40 includes a duplexer 41 for coupling two high-frequency paths with different frequencies, a second communication mode receiver section 42 that is compatible with the second wireless communication mode, a second communication mode transmitter section 43 that is compatible with the second wireless communication mode, a band pass filter (BPF) 44, and a synthesizer 45.

The first communication mode receiver section 32 performs a reception operation during reception in the first wireless communication mode. The first communication mode transmitter section 33 performs a transmission operation during communication in the first wireless communication mode. The second communication mode receiver section 42 performs a reception operation during reception in the second wireless communication mode. The second communication mode transmitter section 43 performs a transmission operation during communication in the second wireless communication mode. It should be noted that although FIG. 1 illustrates the configuration in which separation of the transmission path and the reception path is carried out by the duplexers 31 and 41, it is also possible to selectively switch between the transmission path and the reception path using a high-frequency switch when the communication mode is a TDMA mode.

Figure 2:
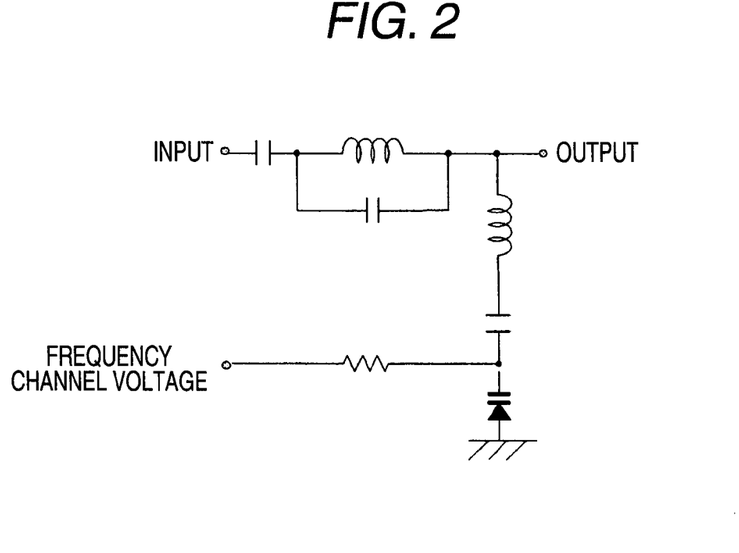
FIG. 2 is a circuit diagram of a variable channel band elimination filter.

The variable channel band elimination filter 34 suppresses, under a predetermined condition, a transmission wave (transmission signal) of a band corresponding to a frequency band of a reception channel that is used by the second communication unit 80, in cooperation with the selector switch 35 is configured to be a notch filter shown in FIG. 2. The details of the function will be described later.

The pass band of the band pass filter 44 is set to be a frequency band used by the second wireless communication mode. This makes it possible to suppress noise output to the frequency band used by the first wireless communication mode in either case where the frequency band used by the first wireless communication mode is at a lower band side or at a higher band side than the frequency band used by the second wireless communication mode.

The synthesizer 45 controls each of a reception signal in the second communication mode receiver section 42 and a transmission signal in the second communication mode transmitter section 43. The synthesizer 45 is a device that generates a signal with a necessary frequency (in transmission/reception) by operations such as frequency division, frequency multiplication, and frequency mixing. Specifically, the synthesizer 45 controls the second communication mode transmitter section 43 and the second communication mode receiver section 42 so as to generate channel frequency signals for transmission and reception.

The second signal processing and controlling section 60 includes a frequency setting section 61 and a frequency-voltage converter section 62. The frequency setting section 61 sets the frequency oscillated in the synthesizer 45 (arrow A in FIG. 1). The frequency (channel) set by the frequency setting section 61 is sent to the synthesizer 45 as serial data, and the transmission channel frequency and the reception channel frequency are controlled.

Figure 3:
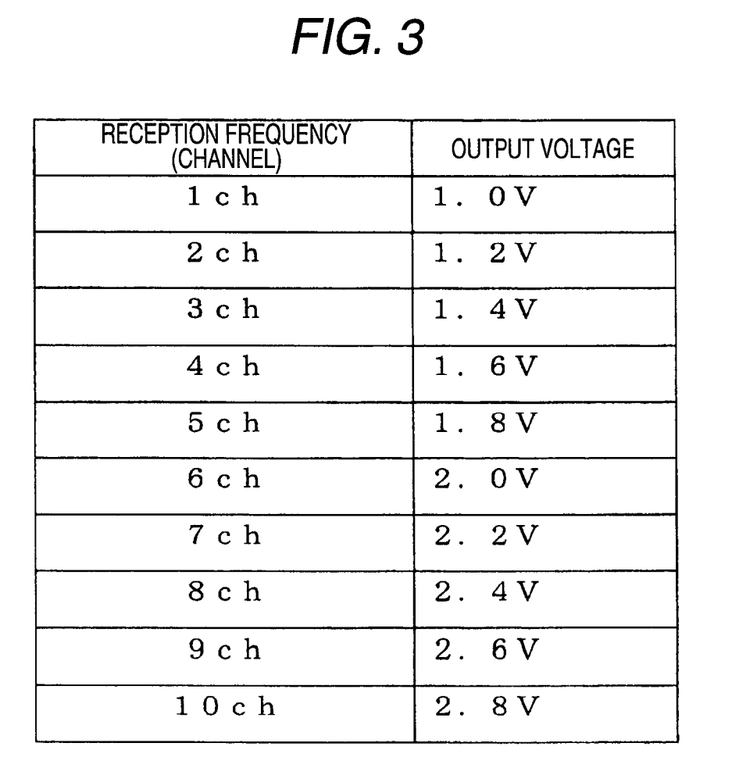
FIG. 3 shows an example of a conversion table for reception channel frequency and analog voltage in a frequency-voltage converter unit.

The frequency-voltage converter section 62 converts the frequency of a signal set by the frequency setting section 61, in particular, the reception channel frequency, into a predetermined analog voltage based on a preinstalled table. An example of such a table is shown in FIG. 3.

Figure 4:
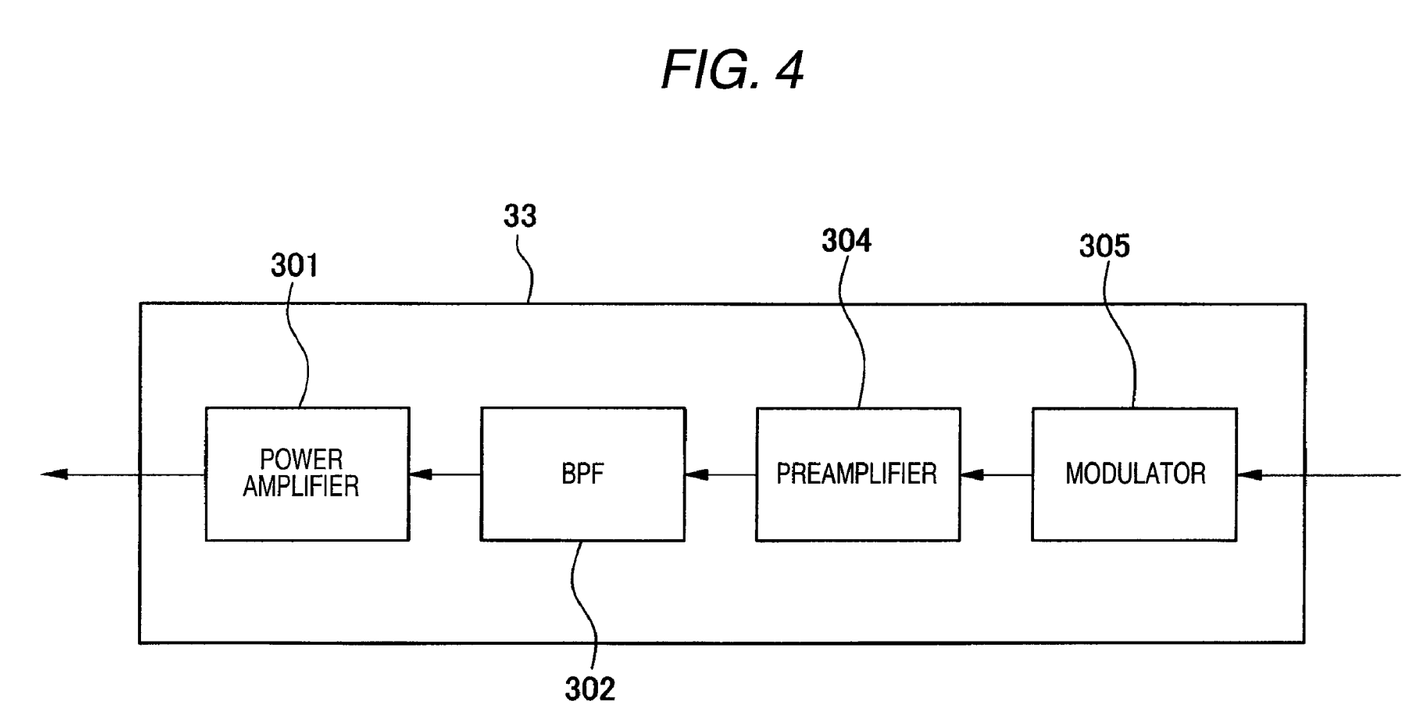
FIG. 4 is a block diagram illustrating a first communication mode transmitter unit.

FIG. 4 is a block diagram illustrating the interior of the first communication mode transmitter unit 33. The first communication mode transmitter section 33 includes a modulator 305, a preamplifier 304, and a power amplifier 301. A band pass filter (BPF) 302 is provided between the power amplifier 301 and the preamplifier 304. Since the band pass filter 302 provided at the previous stage to the power amplifier 301 needs to handle only a small amount of electric power, so the absolute value of loss in pass band becomes small. The band pass filter 302 is configured to be the same as the band pass filter 44 in the second transmitter-receiver section 40.

Next, the operation of the multimode communication apparatus according to the first embodiment of the invention will be described. Herein, the first wireless communication mode is the W-CDMA mode (2 GHz band) and the second wireless communication mode uses a lower frequency band than the W-CDMA mode, and a case in which the variable channel band elimination filter 34 of the first transmitter-receiver section 30 is controlled will be described.

First, communication is conducted by the first transmitter-receiver section 30 in the W-CDMA mode, which is the first wireless communication mode. Normally, a transmission signal that is output from the first communication mode transmitter section 33 is passed through the selector switch 35, the duplexer 31, and the antenna duplexer 20 and is transmitted from the antenna 10. Here, the transmission power is controlled so as to change as appropriate according to arriving power to a base station and communication quality.

However, when the first communication unit 70 performs transmission, there may be cases in which a predetermined band of the transmission wave overlaps with the reception band of the second communication unit 80. In view of this, when the reception sensitivity level during the time the second communication unit 80 has performed reception falls below a certain threshold value, the frequency setting section 61 gives the frequency band of the reception channel that the second communication mode receiver section 42 is receiving to the frequency-voltage converter section 62 (arrow B in FIG. 1), and the frequency-voltage converter section 62 converts the frequency band into a voltage based on a predetermined conversion table. The reception sensitivity is generally determined by the value of the packet error rate (PER). For example, the operation is started when the received input level falls below a threshold value of a predetermined PER (e.g., 0.1%). Of course, it is possible to determine the reception sensitivity using other criteria.

This voltage (channel frequency voltage) is supplied to the variable channel band elimination filter 34 and the selector switch 35 of the first transmitter-receiver section 30 (arrow C in FIG. 1).

The variable channel band elimination filter 34 includes what is called a notch filter. The channel frequency voltage is applied to a variable capacitance diode within the variable channel band elimination filter 34 (see FIG. 2), and by that voltage, passage of the transmission wave having a frequency that belongs to a band corresponding to the band of the reception channel is suppressed. The channel frequency voltage changes in response to the frequency band of the reception channel that the second communication mode receiver section 42 is receiving. The band that is to be suppressed by the variable channel band elimination filter 34 changes in response to the change of the channel frequency voltage.

The toggling of the selector switch 35 is performed by an on signal (H) and an off signal (L), which are the input signals to the selector switch 35. In the present example, only the frequency channel signal that can cause an adverse effect on the reception band of the second transmitter-receiver section 40 side is permitted to pass through the variable channel band elimination filter 34. In the case that the voltage corresponding to the channel frequency that should be allowed to pass through the variable channel band elimination filter 34 is input to the selector switch 35, the input signal becomes an on signal, turning the selector switch 35 to an on state. In this case, after passing though the variable channel band elimination filter 34, the transmission wave from the first communication mode transmitter section 33 is input to the duplexer 31 (first path). As a result, the transmission wave that is input to the duplexer 31 results in a transmission wave in which only the band corresponding to the channel frequency band that is being used by the second communication unit 80 is suppressed. This makes it possible to reduce the loss in pass band as a whole and to suppress the attenuation of the band that is required.

On the other hand, in the case that the channel frequency voltage is not input to the selector switch 35 (including the case that the second communication unit 80 is not used) or in the case that a voltage corresponding to a channel frequency that need not be passed through the variable channel band elimination filter 34 is input to the selector switch 35, the input signal becomes an off signal, and the transmission wave from the first communication mode transmitter section 33 is directly input to the duplexer 31 without passing through the variable channel band elimination filter 34 (second path). Thereby, the band that is not affected by the adverse effect due to the reception by the second communication unit 80 is transmitted without passing through the variable channel band elimination filter 34, and therefore, the loss in pass band is prevented.

A table that serves as the criteria for the switching operation of the selector switch 35 as described above is shown in FIG. 5. The voltage that is output from the frequency setting section 61 according to the table shown in FIG. 3 corresponds to the reception channel frequency. Therefore, the status (on/off) of the selector switch 35 is set in the table in the format corresponding to the voltage. According to the table of FIG. 5, the input to the selector switch 35 becomes an on signal under voltages of 1.0 V, 1.2 V, and 1.4 V, which correspond to 1 channel, 2 channel, and 3 channel, respectively, of the outputs of the second transmitter-receiver section 40 side, and the status of the selector switch 35 becomes "on." When the channel used by the second transmitter-receiver section 40 is 1 channel, 2 channel, or 3 channel, an adverse effect may be caused by the transmission signal of the first transmitter-receiver section 30. Therefore, the status of the selector switch 35 becomes "on," and the transmission signal of the first communication mode communication unit 33 is passed through the variable channel band elimination filter 34 and is suppressed.

Figure 5:
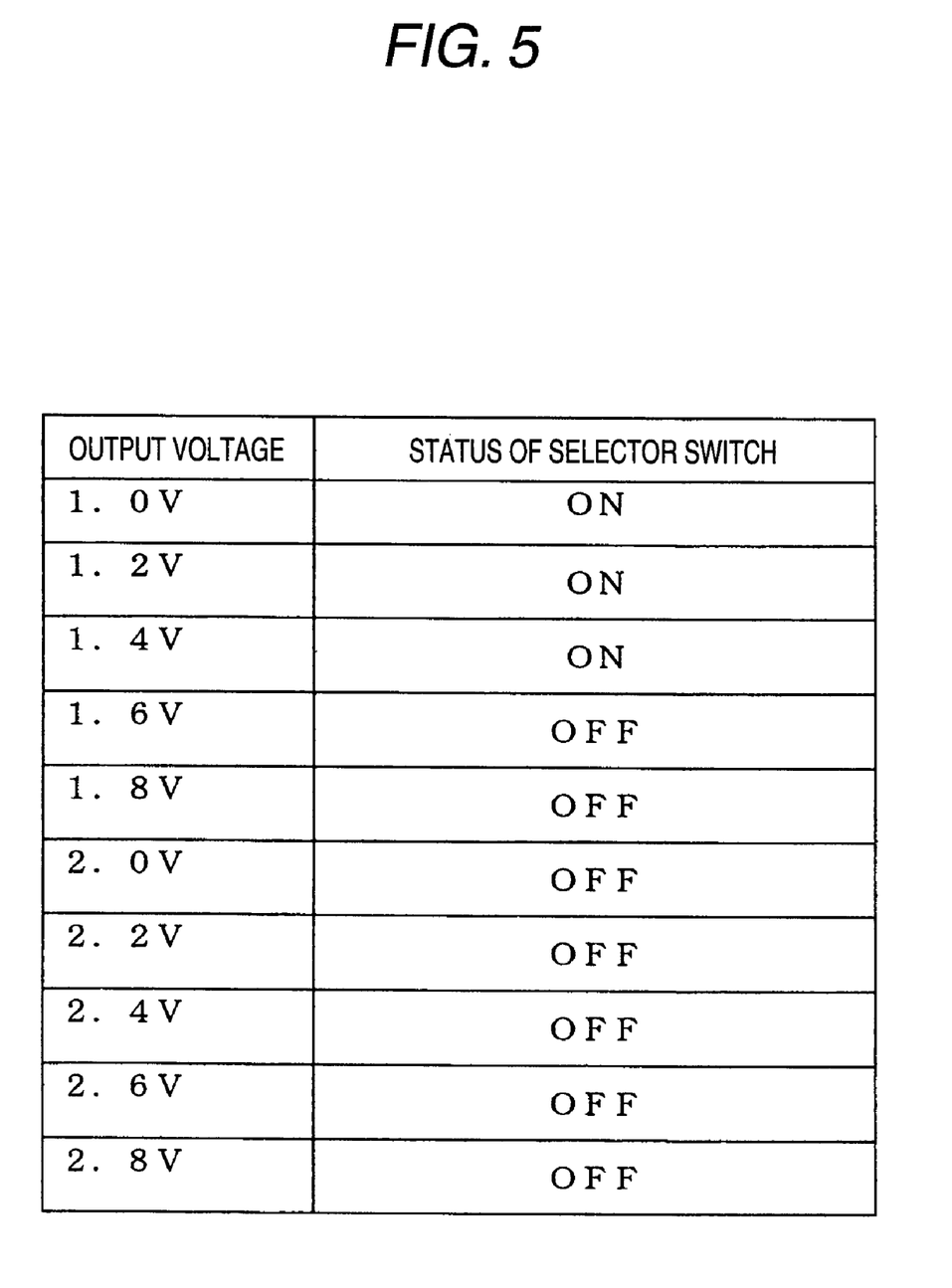
FIG. 5 shows an example of a status table for a selector switch and an output voltage of the frequency-voltage converter unit.

On the other hand, when the channel used by the second transmitter-receiver section 40 is one of 4 channel to 10 channel, little adverse effect is caused by the transmission signal of the first transmitter-receiver section 30. Therefore, the status of the selector switch 35 becomes "off," and the transmission signal of the first communication mode communication unit 33 is not passed through the variable channel band elimination filter 34.

Second Embodiment

Figure 6:
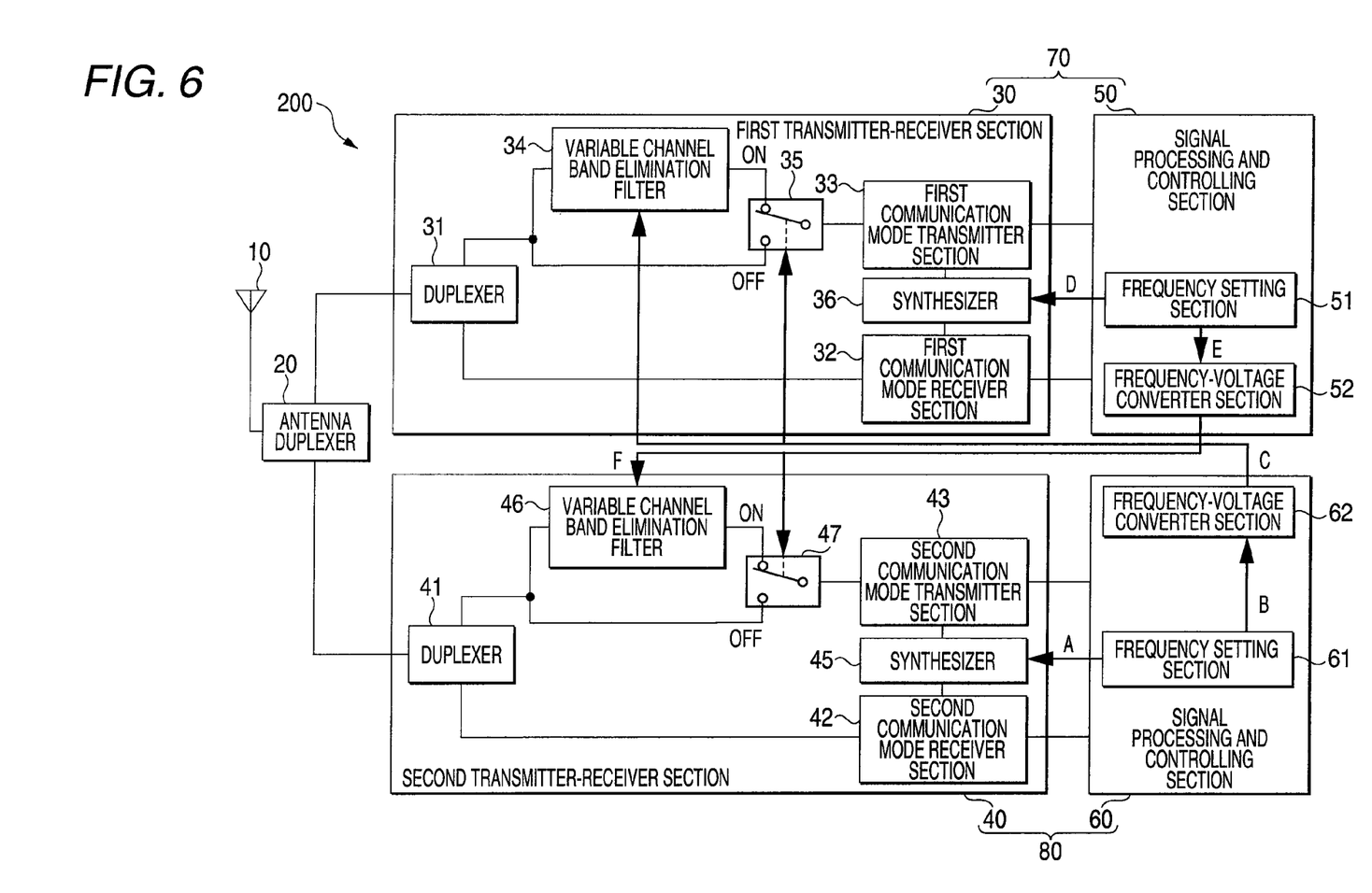
FIG. 6 is a block diagram of a multimode communication apparatus according to a second embodiment.

A multimode communication apparatus according to a second embodiment of the invention will be described. FIG. 6 is a block diagram of a multimode communication apparatus 200 according to the second embodiment of the invention.

In the present embodiment, the first communication unit 70 and the second communication unit 80 have configurations equivalent to each other. Specifically, the first transmitter-receiver section 30 is provided with a synthesizer 36, and the first signal processing and controlling section 50 is provided with a frequency setting section 51 and a frequency-voltage converter section 52. In addition, the second transmitter-receiver section 40 is provided with a variable channel band elimination filter 46 and a selector switch 47. Moreover, the second communication mode transmitter section 43 is configured to be similar to the first communication mode transmitter section 33 shown in FIG. 2.

In this embodiment as well, when the first communication unit 70 performs transmission, the process for suppressing the transmission of the reception band of the second communication unit 80 is conducted in a similar manner to the functions indicated by the arrows B and C in the foregoing description.

Then, when the second communication unit 80 performs transmission, there may be cases in which the band of the transmission wave overlaps with the reception band of the first communication unit 70. In view of this, when the reception sensitivity level during the time the first communication unit 70 has performed reception falls below a certain threshold value, the frequency setting section 51 sets the frequency band of the reception channel that the first communication mode receiver section 32 is receiving and outputs it to the synthesizer 36 (arrow D in FIG. 6) and gives this frequency band to the frequency-voltage converter section 52 (arrow E in FIG. 6), and the frequency-voltage converter section converts the frequency band into a voltage based on a predetermined conversion table. This table is the one equivalent to that shown in FIG. 3.

This voltage (channel frequency voltage) is supplied to the variable channel band elimination filter 46 and the selector switch 47 of the second transmitter-receiver section 40 (arrow F in FIG. 6).

The variable channel band elimination filter 46 includes what is called a notch filter. The channel frequency voltage is applied to a variable capacitance diode within the variable channel band elimination filter 46, and by that voltage, passage of the transmission wave having a frequency that belongs to a band corresponding to the band of the reception channel is suppressed. The channel frequency voltage changes in response to the frequency band of the reception channel that the first communication mode receiver section 32 is receiving. The band that is to be suppressed by the variable channel band elimination filter 46 changes in response to the change of the channel frequency voltage.

The toggling of the selector switch 47 is performed by an on signal (H) and an off signal (L), which are the input signals to the selector switch 47. In the present example, only the frequency channel signal that can cause an adverse effect on the reception band of the first transmitter-receiver section 30 side is permitted to pass through the variable channel band elimination filter 46. In the case that the voltage corresponding to the channel frequency that should be allowed to pass through the variable channel band elimination filter 46 is input to the selector switch 47, the input signal becomes an on signal, turning the selector switch 47 to an on state. In this case, after passing though the variable channel band elimination filter 46, the transmission wave from the second communication mode transmitter section 43 is input to the duplexer 41 (first path). As a result, the transmission wave that is input to the duplexer 41 results in a transmission wave in which only the band corresponding to the channel frequency band that is being used by the first communication unit 70 is suppressed. This makes it possible to reduce the loss in pass band as a whole and to suppress the attenuation of the band that is required.

On the other hand, in the case that the channel frequency voltage is not input to the selector switch 47 (including the case that the first communication unit 70 is not used) or in the case that a voltage corresponding to a channel frequency that need not be passed through the variable channel band elimination filter 46 is input to the selector switch 35, the input signal becomes an off signal, and the transmission wave from the second communication mode transmitter section 43 is directly input to the duplexer 41 without passing through the variable channel band elimination filter 34 (second path). Thereby, the band that is not affected by the adverse effect due to the reception by the first communication unit 70 is transmitted without passing through the variable channel band elimination filter 46, and therefore, the loss in pass band is prevented.

The relationship between the voltages used for the switching operation of the selector switch 47 and the statuses of the switch are specified by a similar table to FIG. 5, and the functions thereof are the same as those of the selector switch 35.

It should be noted that the foregoing embodiments do not limit the arrangement relationship of the frequencies that a plurality of communication modes use. For example, the invention can also be applied to the case in which, in the multimode communication apparatus 100 shown in FIG. 1, the frequency used by the first transmitter-receiver section 30 is lower than the frequency used by the second transmitter-receiver section 40. The invention is also applicable to a multimode communication apparatus that is compatible with three or more wireless communication modes.

Moreover, the foregoing embodiments showed the configurations in which the variable channel band elimination filters 34, 46 are disposed at the output side of the transmitter sections 33, 43, but it is also possible to dispose variable channel band elimination filters at a plurality of respective locations on the transmission path and to set appropriate suppression frequencies for the respective variable channel band elimination filters.

The variable channel band elimination filter used in the invention suppresses, among transmission signals from one transmitter section of one communication unit, a band corresponding to the frequency band of the reception channel that is being received by a receiver section of another communication unit. Here, the phrase "a band of a transmission signal corresponding to a frequency band of a reception channel that is being received by a receiver section of another communication unit" is meant to include a band in the transmission signal that can potentially adversely affect a reception signal that is being used in the other transmission unit. Therefore, no strict correspondence between both of the bands is required, and correspondence between both of the bands that are believed to adversely affect each other can be arbitrarily defined according to the characteristics of the multimode communication apparatus.

Although various embodiments of the invention have been described herein, the invention is not limited to particular details shown in the foregoing embodiments. It is expected that various modifications and applications may occur to those skilled in the art based on the teachings described in the specification and known art, and they are also within the scope of protection which is sought.

INDUSTRIAL APPLICABILITY

According to the invention, it becomes possible to suppress interference between communications under different wireless communication modes and to ensure a good transmission/reception state in each of the wireless communication modes in multimode communication apparatus that uses a plurality of wireless communication modes.

Although the invention has been shown and described in detail with reference to specific preferred embodiments thereof, it will be apparent to those skilled in the art that various changes and modifications may be made herein without departing from the scope and spirit of the invention.

This application claims priority from Japanese Patent Application No. 2005-022615, filed on Jan. 31, 2005, which are incorporated herein by reference.

The invention claimed is:

1. A multimode communication apparatus compatible with a plurality of wireless communication modes, comprising:
a plurality of communication units which are compatible with the wireless communication modes independently of one another, and each of which includes a transmitter section and a receiver section,
wherein at least one of the communication units includes a variable channel band elimination filter which suppresses, in a transmission signal from its own transmitter section, a band corresponding to a frequency band of a reception channel received by a receiver section of another communication unit; and
wherein the variable channel band elimination filter is capable of varying the band to be suppressed in response to a change of the frequency band of the reception channel.

2. The multimode communication apparatus according to claim 1, wherein the plurality of communication units includes a first communication unit and a second communication unit;
wherein the first communication unit includes the variable channel band elimination filter; and
wherein the second communication unit includes a frequency setting section which sets the frequency band of the reception channel and a frequency-voltage converter section which converts the frequency band set by the frequency setting section into a voltage and supplies the voltage to the variable channel band elimination filter.

3. The multimode communication apparatus according to claim 2, wherein the first communication unit includes a selector switch which detects the voltage from the frequency-voltage converter section, the selector switch connected between the transmitter section and the variable channel band elimination filter; and
wherein the selector switch selects a first path for supplying a transmission signal from the transmitter section to the variable channel band elimination filter or a second path for not supplying the transmission signal from the transmitter section to the variable channel band elimination filter based on the voltage.

4. The multimode communication apparatus according to claim 3, wherein each of the first communication unit and the second communication unit includes all the mentioned elements, and the first communication unit and the second communication unit have configurations equivalent to each other.

5. The multimode communication apparatus according to claim 1, wherein the variable channel band elimination filter includes a notch filter.

* * * * *